May 8, 1923.
W. WIRTZ
1,454,203
DRIVING ATTACHMENT FOR ICE CREAM FREEZERS AND THE LIKE
Filed March 24, 1922 — 2 Sheets-Sheet 1
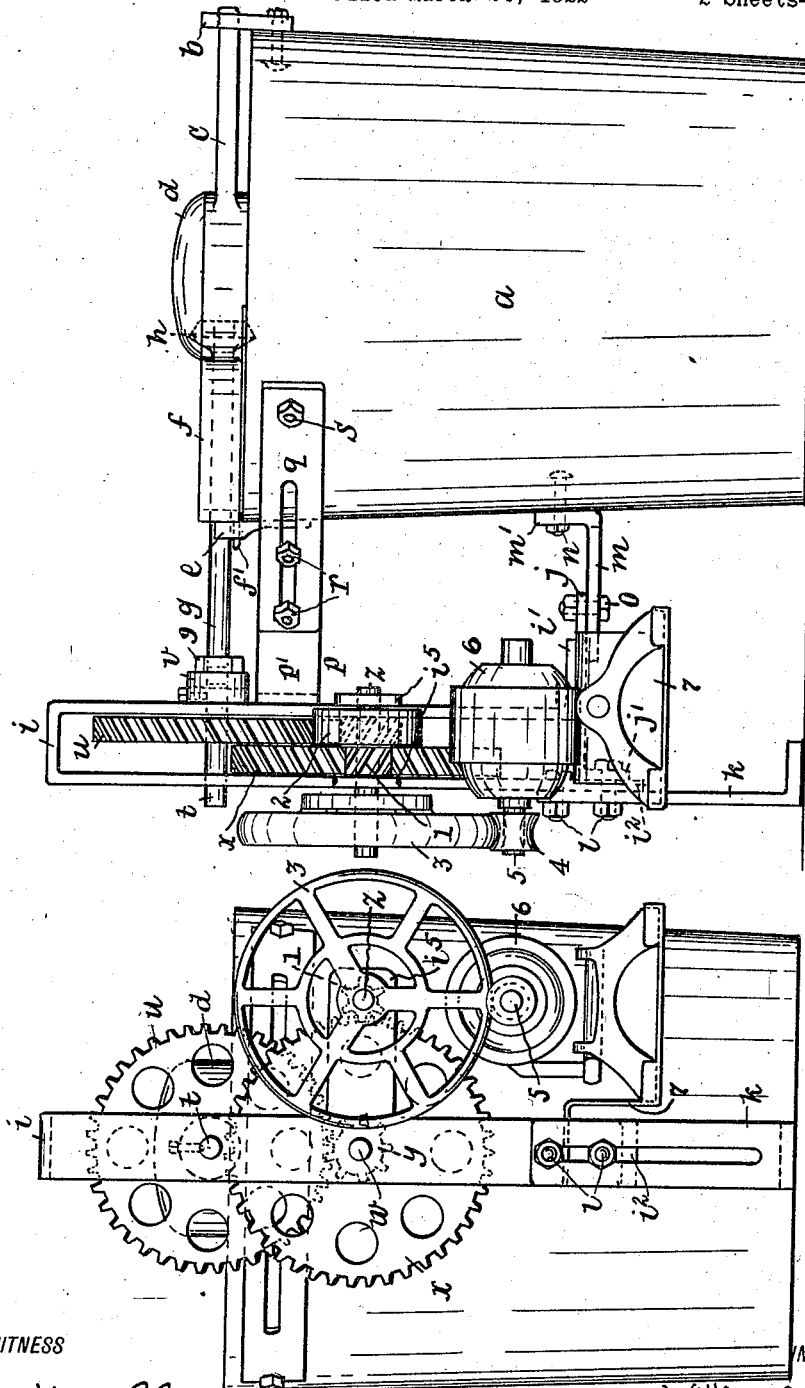
WITNESS
Wm. J. Bell
INVENTOR,
William Wirtz,
John Steward,
ATTORNEY May 8, 1923. 1,454,203
W. WIRTZ
DRIVING ATTACHMENT FOR ICE CREAM FREEZERS AND THE LIKE
Filed March 24, 1922 2 Sheets-Sheet 2
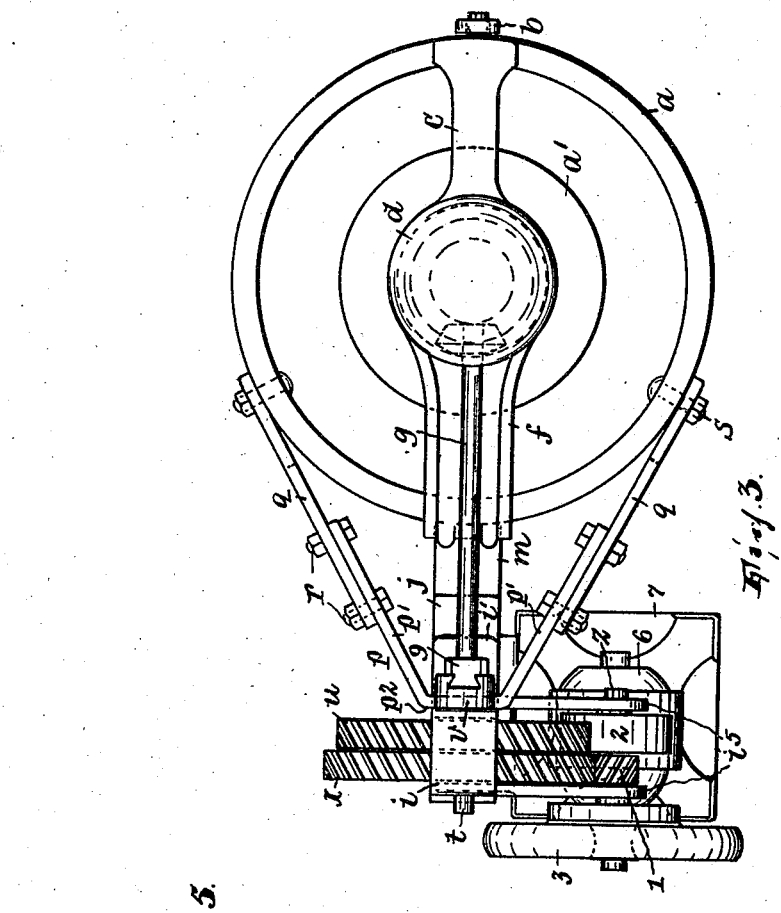
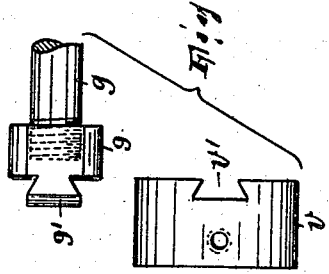
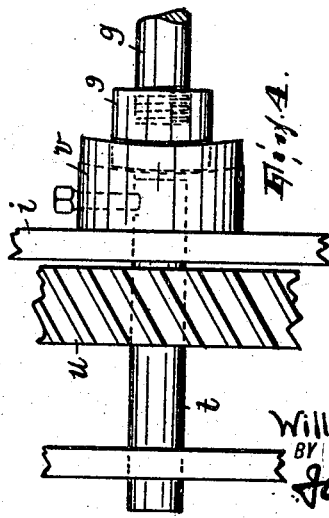
WITNESS
INVENTOR,
William Wirtz,
BY
ATTORNEY.

Patented May 8, 1923.

1,454,203

UNITED STATES PATENT OFFICE.

WILLIAM WIRTZ, OF CRISTOBAL, CANAL ZONE, PANAMA.

DRIVING ATTACHMENT FOR ICE-CREAM FREEZERS AND THE LIKE.

Application filed March 24, 1922. Serial No. 546,311.

*To all whom it may concern:*

Be it known that I, WILLIAM WIRTZ, a citizen of the United States, residing at Cristobal, Canal Zone, Panama, have invented certain new and useful Improvements in Driving Attachments for Ice-Cream Freezers and the like, of which the following is a specification.

This invention relates to ice cream freezers and other apparatus of that character, such as churns, in which there is a substantially cylindrical vessel to hold the material to be agitated, a dasher or agitator, and a head arranged on the vessel and forming a casing and bearing for certain parts whereby motion is transmitted to the agitator, which head in the case of an ice cream freezer also overlies the can contained in said vessel and in which the ice cream mixture is placed and is usually arranged to be swung up or tilted on said vessel on a pivot so as to have access to the can and its contents. One of the principal objects of the invention is to provide an attachment for driving the agitators of such apparatus automatically, as by an electric motor, so constructed that it can be readily attached by the owner of any such apparatus, although the different apparatus may vary in size. Another object is so to construct the attachment that it may be adapted to those forms of apparatus which have the tiltable head, to the end that the primary element in the train of moving parts carried by the head may be instantly coupled with or uncoupled from the driving train of the attachment.

In the drawings,

Fig. 1 is a side elevation of an ice cream freezer and my attachment connected therewith;

Fig. 2 is a front elevation of what is shown in Fig. 1;

Fig. 3 is a plan; and

Figs. 4 and 5 illustrate details.

$a$ designates the bucket or outer vessel of an ice cream freezer which, as usual, will contain the can for the ice cream mixture and in the can $a'$ the dasher or agitator, which is not shown. At the top of the vessel is the usual casting or eye-piece $b$ forming a pivot-socket for one of the arms $c$ of the head $d$ and diametrically opposite said eye-piece is the casting $e$ forming a fork or crotch to receive a lug $f'$ on the other arm $f$ of the head. The head affords a housing and bearing for a driving train for the dasher in the usual way, only one member of such train being shown, to wit, the rotary shaft $g$, which has on its inner end the bevel gear $h$ and extends longitudinally of and projects outwardly beyond the end of said arm. The head can be tilted on the casting $b$ as a pivot so as to have access to the contents of the vessel $a$ for any purpose.

A frame for my attachment is formed as follows: There is an inverted U-shaped upright $i$ composed of a bent strip of metal having one extremity $i'$ bent away from the other at right angles and the other $i^2$ prolonged downwardly. A metal plate $j$ is rigidly secured, as by riveting or otherwise, to the under side of the bent-off extremity $i'$ and extends toward the extremity $i^2$ and has a projecting end $j'$ adjoining the same bent downwardly and bearing thereagainst; it thus acts as a rigid brace between the lower end portions of the U-shaped member $i$. A longitudinally slotted upright bracket or foot-piece $k$ is secured face to face against the outer surface of the outer leg of the upright $i$ by bolts $l$ extending through the slot of the foot-piece, one of which bolts may be employed to clamp the member $j$ to the prolongation $i^2$. A longitudinally slotted strap $m$ having one end turned upwardly, as at $m'$, is secured face to face against the member $j$ by a bolt $o$ passing through its slot, its upturned end $m'$ being adapted to be secured to the side of the vessel $a$ by a bolt $n$.

The upright is connected with the vessel, above the member $j$, by a V-shaped adjustable brace constructed as follows: A metal strap $p$ is bent so that its extremities $p'$, of equal length, form an each an obtuse angle with and converge toward its mid-portion $p^2$. To each extremity $p'$ is secured a metal strap $q$ which is longitudinally slotted and receives in its slot the bolts $r$ whereby the strap is fastened to the said extremity. This V-shaped bracket forms a crotch to receive the vessel $a$ to which its ends, standing in tangenial relation thereto, may be secured by bolts $s$. The mid-portion of the crotch may be secured to the near leg of the upright in any way, as by riveting. The construction of the frame is such that it may not only be attached to a vessel $a$ very readily by the user himself, but can be attached to vessels varying not only in diameter or height but also with uniform stability to vessels varying as to their downward taper, this last being due to the three-point or tripod contact which the upper or crotch brace $p$ and the lower brace $j$—$m$ have upon the vessel. The attachment may be adapted to vessels $a$ of different heights or diameters by adjusting the foot-piece or the braces.

In the upright is journaled a horizontal shaft $t$ which is kept against endwise movement by a spiral-cut gear $u$ and a collar $v$ secured thereon on opposite sides of its inner leg or extremity. Below this shaft there is also journaled in the upright another horizontal shaft $w$ having secured thereon a spiral-cut gear $x$ and a spiral-cut pinion $y$ which stand between said legs or extremities and thereby keep the shaft against endwise movement; the spiral-cut pinion is in mesh with the gear $u$. The legs or extremities have lateral extensions $i'$ in which is journaled another horizontal shaft $z$ on which are fixed between said legs the pinion 1, in mesh with gear $x$, and a fly-wheel 2. On one end of this shaft is also fixed the main drive-wheel 3. The train of gearing thus formed may be driven by a grooved pulley or wheel 4 on the shaft 5 of an electric motor 6 which may be suitably supported, as on the downwardly and then laterally bent extension 7 of member $j$.

A coupling between the shafts $g$ and $t$ which, when the coupling members are engaged with each other, in any event prevents separating movement of either shaft from the other, and also permits its members to be engaged with or disengaged from each other when shaft $g$ is raised or lowered with the tilting head $d$, is afforded thus: Collar $v$ has a transverse groove $v'$ in its outer face, and on shaft $g$ is a collar 9 having a dove-tail tongue adapted to be received by the groove. The adjoining faces of the members $v$ and 9 are curved around the point of tilting movement of the head $d$, and the groove and tongue may be correspondingly curved thus to obtain a good fit between the members $v$ and 9 and eliminate lost motion. The dove-tail form of the tongue prevents longitudinal separation of the two shafts. When the revolving train is stopped with the tongue and groove extending vertically the head is free to be tilted upwardly.

Having thus fully described my invention, what I claim as new and desire to secure by Letters Patent is:—

1. In combination, with a fixed structure including a substantially cylindrical vessel and with a part to be driven arranged in said structure, a frame arranged beside and secured to said structure and having a lateral crotch receiving the vessel between, and bearing at a given elevation against said vessel at its extremities and a lateral brace bearing against the vessel at another elevation and in a vertical plane bisecting the crotch, and means in the frame to drive said part.

2. In combination, with a fixed structure including a substantially cylindrical vessel and with a part to be driven arranged in said structure, means to drive said part, a supporting structure for said means arranged beside the vessel, and a crotch including a stiff strap bent into substantially V-shaped form and secured at its mid-portion to the supporting structure, said crotch having extremities bearing against and secured to the vessel and receiving the latter between them.

3. In combination, with a fixed structure including a substantially cylindrical vessel and with a part to be driven arranged in said structure, means to drive said part, a supporting structure for said means arranged beside the vessel, and a crotch including a stiff strap bent into substantially V-shaped form and secured at its mid-portion to the supporting structure and members secured to and receiving the vessel between them and adjustable longitudinally of the extremities of the crotch.

4. In combination, with a fixed structure including a substantially cylindrical vessel and with a part to be driven arranged in said structure, a frame arranged beside and secured to said vessel and including an upright consisting of a bent stiff strap having its extremities upright and spaced from each other, and means to drive said part including gearing journaled in the upright and arranged between the extremities of said strap.

5. In combination, with a fixed structure including a substantially cylindrical vessel and with a part to be driven arranged in said structure, a frame arranged beside said vessel and including an inverted U-shaped upright and a brace connecting the upright and vessel and also connecting the extremities of the former, and means to drive said part including gearing journaled in the upright between said extremities thereof.

6. In combination, with supporting means including a vessel, a head on said means, and a rotary member journaled in the head on a substantially horizontal axis, a rotary driving member journaled in the supporting means in axial alinement with the first member, said members having coacting rotation-transmission coupling portions at their adjoining ends consisting of a slot on one and a tongue on the other engaged in the slot and the head being tiltable upwardly on said means on an axis removed from said coupling portions.

7. In combination, with supporting means including a vessel, a head on said means, and a rotary member journaled in the head on a substantially horizontal axis, a rotary driving member journaled in the supporting means in axial alinement with the first member, said members having coacting rotation-transmitting coupling portions at their adjoining ends holding said members against axial separation and separable on movement of one relatively to the other transversely of said axis and the head being tiltable upwardly on said means on an axis removed from said coupling portions.

In testimony whereof I affix my signature.

WILLIAM WIRTZ.